(12) United States Patent
Zhang et al.

(10) Patent No.: US 11,776,535 B2
(45) Date of Patent: Oct. 3, 2023

(54) SEMANTIC UNDERSTANDING METHOD AND APPARATUS, AND DEVICE AND STORAGE MEDIUM

(71) Applicant: BEIJING BYTEDANCE NETWORK TECHNOLOGY CO., LTD., Beijing (CN)

(72) Inventors: He Zhang, Beijing (CN); Hang Li, Beijing (CN); Yang Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/885,965

(22) Filed: Aug. 11, 2022

(65) Prior Publication Data

US 2022/0392440 A1    Dec. 8, 2022

Related U.S. Application Data

(63) Continuation of application No. PCT/CN2021/084846, filed on Apr. 1, 2021.

(30) Foreign Application Priority Data

Apr. 29, 2020    (CN) .......................... 202010356038.8

(51) Int. Cl.
*G10L 15/18*    (2013.01)
*G10L 15/183*    (2013.01)

(52) U.S. Cl.
CPC ........ *G10L 15/1815* (2013.01); *G10L 15/183* (2013.01)

(58) Field of Classification Search
None
See application file for complete search history.

(56) References Cited

U.S. PATENT DOCUMENTS

| | | | |
|---|---|---|---|
| 8,122,026 B1 * | 2/2012 | Laroco, Jr. ............... | G06N 5/04 |
| | | | 707/730 |
| 9,542,450 B1 * | 1/2017 | Jacobsson ........... | G06F 16/9024 |

(Continued)

FOREIGN PATENT DOCUMENTS

| CN | 101645064 A | 2/2010 |
|---|---|---|
| CN | 105512105 A | 4/2016 |

(Continued)

OTHER PUBLICATIONS

International Search Report dated Jul. 1, 2021 in International Patent Application No. PCT/CN2021/084846 (10 pages) with an English translation (2 pages).

(Continued)

*Primary Examiner* — Jakieda R Jackson (57) ABSTRACT

A semantic understanding method and apparatus, and a device and a storage medium are provided. The method includes: acquiring a recognition character string that matches speech information; acquiring, from an entity vocabulary library, at least one entity vocabulary respectively corresponding to each recognition character in the recognition character string; and according to a situation of each entity vocabulary hitting the recognition character string, determining a matching entity vocabulary as a semantic understanding result of the speech information. By means of the method, insofar as a completely matching entity vocabulary is not acquired, a matching entity vocabulary can still be determined according to an entity vocabulary library, and semantic information of speech is thus accurately understood; and the method also has relatively high fault tolerance for situations such as wrong words, added words, and omitted words, such that the semantic understanding accuracy of speech information is improved.

17 Claims, 4 Drawing Sheets

(56) References Cited

U.S. PATENT DOCUMENTS

| | | | |
|---|---|---|---|
| 9,934,777 B1* | 4/2018 | Joseph | G10L 15/22 |
| 10,706,045 B1* | 7/2020 | Hasija | G06F 16/243 |
| 10,853,398 B2* | 12/2020 | Fisher | G06F 40/284 |
| 2004/0030540 A1* | 2/2004 | Ovil | G06F 40/253 704/1 |
| 2004/0254783 A1* | 12/2004 | Isahara | G06F 40/55 704/9 |
| 2005/0182752 A1* | 8/2005 | Rojer | G06F 16/284 |
| 2007/0106499 A1 | 5/2007 | Dahlgren et al. | |
| 2011/0022292 A1* | 1/2011 | Shen | G10L 15/1815 704/E15.001 |
| 2011/0137636 A1* | 6/2011 | Srihari | G06F 40/53 704/2 |
| 2011/0307440 A1* | 12/2011 | Panchenko | G06F 16/27 707/600 |
| 2012/0232904 A1 | 9/2012 | Zhu et al. | |
| 2014/0025626 A1* | 1/2014 | Mefford | G06F 16/2453 707/706 |
| 2015/0073777 A1* | 3/2015 | Assam | G06F 40/30 704/9 |
| 2016/0042061 A1* | 2/2016 | Sengupta | G06F 40/30 707/738 |
| 2016/0098393 A1* | 4/2016 | Hebert | G06F 40/40 704/9 |
| 2018/0190270 A1 | 7/2018 | Chen | |
| 2018/0225375 A1* | 8/2018 | Collins | G06F 16/951 |
| 2019/0294678 A1* | 9/2019 | Sapugay | G10L 15/19 |

FOREIGN PATENT DOCUMENTS

| | | |
|---|---|---|
| CN | 106326303 A | 1/2017 |
| CN | 107622053 A | 1/2018 |
| CN | 110299139 A | 10/2019 |
| CN | 111081218 A | 4/2020 |
| JP | 2000010583 A | 1/2000 |

OTHER PUBLICATIONS

First Office Action dated Oct. 19, 2022 in Chinese Patent Application No. 2020010356038 8 with an English translation (16 pages).

* cited by examiner

SEMANTIC UNDERSTANDING METHOD AND APPARATUS, AND DEVICE AND STORAGE MEDIUM

CROSS REFERENCE OF RELATED APPLICATIONS

The present application is a continuation of International Application No. PCT/CN2021/084846, filed on Apr. 1, 2021 which claims the priority to Chinese Patent Application No. 202010356038.8, titled "SEMANTIC UNDERSTANDING METHOD AND APPARATUS, DEVICE AND STORAGE MEDIUM", filed on Apr. 29, 2020, both of which are incorporated herein by reference in their entireties.

FIELD

The embodiment of the present disclosure relates to a computer application technology and a natural language processing technology, in particular to a semantic determining method and apparatus, a device and a storage medium.

BACKGROUND

With the continuous progress of science and technology, the natural language processing technology has developed rapidly, which has brought great convenience to daily life of the people and industrial production.

In a related semantic understanding technology, a large number of entity vocabularies are usually stored in advance through a dictionary tree. When information to be detected is acquired, a corresponding entity vocabulary is found in the dictionary tree through character string search. If the corresponding entity vocabulary is found, the entity vocabulary reflects semantics of the information to be detected. If the corresponding entity vocabulary is not found, it indicates that there is no entity in the information to be detected.

SUMMARY

A semantic determining method and apparatus, a device and a storage medium are provided according to the present disclosure.

In a first aspect, a semantic determining method is provided according to an embodiment of the present disclosure. The semantic determining method includes:

acquiring a recognition character string matching with speech information;

acquiring, for each recognition character in the recognition character string, at least one entity vocabulary corresponding to the recognition character in an entity vocabulary library; and determining, based on a hit of the entity vocabulary to the recognition character string, a matched entity vocabulary as a semantic determining result of the speech information.

In a second aspect, a semantic determining apparatus is provided according to an embodiment of the present disclosure. The semantic determining apparatus includes: a recognition character string acquisition module, an entity vocabulary acquisition module and a semantic determining result determination module.

The recognition character string acquisition module is configured to acquire a recognition character string matching with speech information.

The entity vocabulary acquisition module is configured to acquire, for each recognition character in the recognition character string, at least one entity vocabulary corresponding to the recognition character in an entity vocabulary library.

The semantic determining result determination module is configured to determine, based on a hit of the entity vocabulary to the recognition character string, a matched entity vocabulary as a semantic determining result of the speech information.

In a third aspect, an electronic device is provided according to an embodiment of the present disclosure. The electronic device includes a memory, a processing device, and a computer program stored on the memory and operable on the processing device, wherein the processing device, when executing the program, implements the semantic determining method according to any embodiment of the present disclosure.

In a fourth aspect, a storage medium containing computer executable instructions is provided according to an embodiment of the present disclosure. The computer executable instructions, when executed by a computer processor, cause the computer processor to implement the semantic determining method according to any embodiment of the present disclosure.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals throughout the drawings represent the same or similar elements. It should be understood that the drawings are schematic and the components and elements are unnecessarily drawn to scale.

DETAILED DESCRIPTION

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include additional steps and/or omit to perform the illustrated steps, not limiting the scope of the present disclosure.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different apparatuses, modules or units, and are not used to limit an sequential order or interdependence of the functions performed by the apparatuses, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

A name of a message or information exchanged between multiple apparatuses in the embodiments of the present disclosure are for illustrative purposes only, and are not intended to limit the scope of these messages or information.

Figure 1:
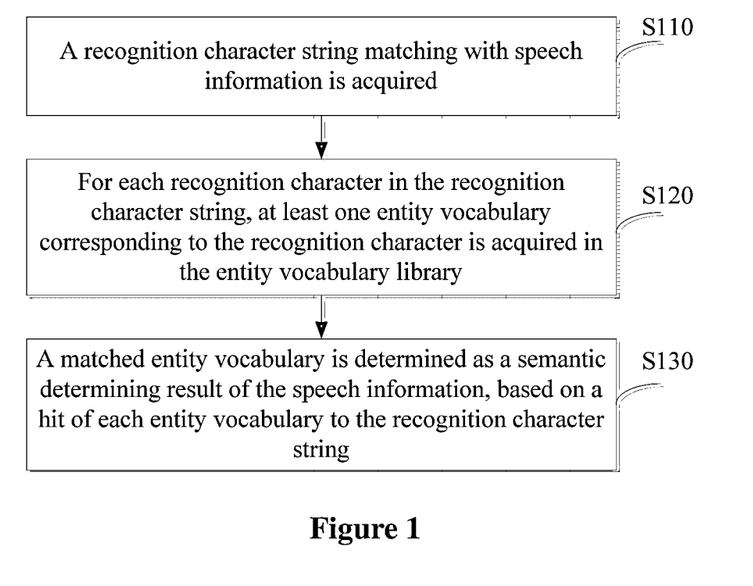
FIG. 1 is a flowchart of a semantic determining method according to a first embodiment of the present disclosure.

FIG. 1 is a flowchart of a semantic determining method according to a first embodiment of the present disclosure. This embodiment may be applied to the situation of accurately understanding semantics of speech information based on an entity vocabulary library. The method may be performed by a semantic determining apparatus in the embodiment of the present disclosure, and the semantic determining apparatus may be implemented by software and/or hardware and integrated in a terminal device or a server. The method includes the following S110 to S130.

In S110, a recognition character string matching with speech information is acquired.

Automatic Speech Recognition (ASR) technology is applied to the acquired speech information to acquire a matched recognition character string. Specifically, a speech recognition model may be established based on a large amount of corpus information after speech signal processing and knowledge mining Once a target speech information is acquired, speech feature extraction and feature matching is performed on the target speech information by the trained speech recognition model, to acquire the recognition character string of the target speech information. In an embodiment of the present invention, the technical means adopted for speech recognition are not specifically limited, and the type of the speech recognition model is not specifically limited.

In S120, for each recognition character in the recognition character string, at least one entity vocabulary corresponding to the recognition character is acquired in the entity vocabulary library.

An entity vocabulary includes nouns and pronouns and other words with practical significance. Specifically, the entity vocabulary may include names of things with specific significance and complete sentences, such as verses, lyrics, famous quotes. In the embodiment of the present invention, the type of entity vocabulary in the entity vocabulary library is not specifically limited. Based on each character in the recognition character string, an entity vocabulary containing one or more characters in the recognition character string in the entity vocabulary library is acquired. For example, the recognition character string acquired according to the speech information is "Bright and clear light in front of my bed".

Then, corresponding entity vocabularies are acquired based on the characters "bed", "front", "bright", "clear" and "light", and entity vocabularies "Bright light of the moon in front of my bed", "The bright moon shines on the pines" and "What time does the bright moon appear" are acquired.

Optionally, in an embodiment of the present invention, before acquiring the recognition character string matching with the speech information, the method further includes: establishing a descending index table matching with the entity vocabulary library based on the entity vocabularies included in the entity vocabulary library. The descending index table includes multiple key-value pairs. A key name in the key-value pairs is a character, and a value in the key-value pairs is at least one entity vocabulary containing the character. The at least one entity vocabulary corresponding to the recognition character is acquired in the entity vocabulary library by: querying the descending index table matching with the entity vocabulary library, and acquiring the at least one entity vocabulary corresponding to the recognition character in the recognition character string. Each entity vocabulary in the entity vocabulary library is stored in the descending index table in the form of key-value pair. The key name is a character included in the entity vocabulary library, and the value is the entity vocabulary corresponding to the key name in the entity vocabulary library. For example, if the entity vocabulary is "Bright light of the moon in front of my bed", in the key-value pairs with key names "bed", "front", "bright", "moon" and "light", the "Bright light of the moon in front of my bed" is the value corresponding to the above key values. In addition, there are other values corresponding to the above characters. For example, the key-value pair with the key name "bright" further includes values "The bright moon shines on the pines" and "what time does the bright moon appear". The number of characters in the entity vocabulary is relatively fixed (for example, the total number of Chinese characters is relatively fixed), but the variations of the entity vocabulary formed by the combination of characters are diverse and numerous. Therefore, the utilization of the descending index table to record each entity vocabulary in the entity vocabulary library improves the retrieval efficiency of the entity vocabulary. For the update of the entity vocabulary library, for example, the addition of an entity vocabulary, a new entity vocabulary is only required to associate with each of the corresponding characters. If the new entity vocabulary contains a new character, the new character is taken as a new key name, and the entity vocabulary itself is also taken as a value corresponding to the new key name In this way, the entity vocabulary library is updated, and the efficiency of storing the entity vocabulary is improved.

In an embodiment of the present invention, after at least one entity vocabulary corresponding to the recognition character is acquired, the method further includes: determining whether there is a duplicate entity vocabulary in the acquired entity vocabularies; and deleting the duplicate entity vocabulary to ensure no duplicate vocabulary in the entity vocabularies acquired based on each recognition character in the recognition character string in the case that there is a duplicate entity vocabulary in the acquired entity vocabularies. In this way, the number of entity vocabularies to be determined is reduced when the hit of each entity vocabulary on the recognition character string is determined, which improves the efficiency of acquiring the entity vocabulary matching with the speech information.

In an embodiment of the present invention, before the at least one entity vocabulary corresponding to the recognition character is acquired in the entity vocabulary library, the method further includes: acquiring effective recognition characters in the recognition character string based on the recognition character string and a preset invalid character list; For each recognition character in the recognition character string, the at least one entity vocabulary corresponding to the recognition character in the recognition character string is acquired in the entity vocabulary library, by acquiring, in the entity vocabulary library, at least one entity vocabulary corresponding to an effective recognition character in the recognition character string. Meaningless characters and/or vocabularies without obvious indication are pre-stored in the preset invalid character list, such as "of", "Huh", "this" and "that". After the recognition character string is acquired, the recognition character string is filtered based on invalid characters in the preset invalid character list, to take other characters in the recognition character string except for the invalid characters as valid recognition characters. Then, the corresponding entity vocabulary is acquired based on the valid recognition characters to acquire an entity vocabulary in a targeted way, which improves acquisition efficiency.

In S130, a matched entity vocabulary is determined as a semantic determining result of the speech information, based on a hit of each entity vocabulary to the recognition character string.

The matched entity vocabulary is determined, based on the hit of the entity vocabulary to the recognition character string, that is, based on the number of the same characters between each entity vocabulary and the recognition character string. Then, the semantics of the speech information is accurately understood based on the entity vocabulary. Taking the above technical solution as an example, the recognition character string is "Bright and clear light in front of my bed". The acquired entity vocabularies are "Bright light of the moon in front of my bed", "The bright moon shines on the pines" and "What time does the bright moon appear". Thus, the number of the same characters between the above entity vocabularies and the recognition character string is 4, 1 and 1. The entity vocabulary matching with the speech information is determined to be "Bright light of the moon in front of my bed". Based on this, the accurate matching between the speech information and the entity vocabulary in entity vocabulary library is realized, which has strong fault-tolerance especially for the wrong word, the extra word or the missing word.

In the above technical solution, the number of characters of the entity vocabulary and the recognition character string may be the same, and a character similarity may be determined based on the number of the same characters. In another embodiment, for the case that the number of characters of the entity vocabulary is different from that of the recognition character string, the character similarity needs to be determined by multiple local recognition character strings in the recognition character string. Specifically, the matched entity vocabulary as the semantic determining result of the speech information is determined based on the hit of the entity vocabulary to the recognition character string, by traversing, based on a character length of the entity vocabulary, local recognition character strings matching with the character length in the recognition character string; and calculating local similarities between the local recognition character strings and the matched entity vocabulary; determining, based on the local similarities between the recognition character string and the entity vocabulary, the entity vocabulary matching with the speech information. For example, the recognition character string is ""Bright and clear light in front of my bed"'s next sentence", and the acquired entity vocabulary includes "Bright light of the moon in front of my bed", "The bright moon shines on the pines" and "What time does the bright moon appear", where the character length of "Bright light of the moon in front of my bed (床前明月光 in Chinese)" is 5 characters. The local recognition character strings are traversed in the recognition character string ""Bright and clear light in front of my bed"'s next sentence". That is, "Bright light of the moon in front of my bed" is compared with the local recognition character strings "Bright and clear light in front of my bed", "clear light in front of my bed"'s next" and "light in front of my bed"'s next sentence" respectively to acquire the local similarities. "Bright light of the moon in front of my bed" has the highest local similarity with the local recognition character string "Bright and clear light in front of my bed", and the highest local similarity is used as the similarity between the entity vocabulary "Bright light of the moon in front of my bed" and the recognition character string ""Bright and clear light in front of my bed"'s next sentence". In the same way, the similarity between "The bright moon shines on the pines" and the recognition character string ""Bright and clear light in front of my bed"'s next sentence", and the similarity between "what time does the bright moon appear" and the recognition character string ""Bright and clear light in front of my bed"'s next sentence" are acquired. Then, "Bright light of the moon in front of my bed" are finally determined as the matched entity vocabulary, and the matched entity vocabulary is added to the semantic determining result.

In particular, the semantic determining result may be unique. The semantic determining result is returned and showed, or a follow-up operation is performed directly based on the entity vocabulary and character information in the speech information. Taking the recognition character string ""Bright and clear light in front of my bed"'s next sentence" in the above technical solution as an example, "Are you looking for 'The next sentence of Bright light of the moon in front of my bed'?" may be returned, after the matched entity vocabulary is determined as "Bright light of the moon in front of my bed". When a confirmation instruction is received, a follow-up operation is performed to acquire the corresponding information of the next sentence. Alternatively, after the matched entity vocabulary is determined as "Bright light of the moon in front of my bed", information of the next sentence matching with "Bright light of the moon in front of my bed" is directly found. In an embodiment, the semantic determining result may be not unique. For example, after that the matched entity vocabulary is determined as "The bright moon is rising above the sea" and "To invite the moon, I raise my cup", the above entity vocabularies are added to the semantic determining result and the semantic determining result is returned. When a selection instruction is acquired, a follow-up operation is performed based on the selection instruction.

In an embodiment, if the entity vocabulary contains the more characters, it is more likely to hit the recognition character string. Therefore, the similarities between the entity vocabulary and the local recognition character strings cannot be accurately reflected only in dependence on the number of the same characters in the entity vocabulary and the local recognition character strings. In an embodiment of the present invention, the number of the same characters in the entity vocabulary and the local recognition character string divided by the number of characters in the entity vocabulary is equal to the local similarity, to improve the accuracy of the acquired local similarity.

In the technical solution of the embodiments of the present disclosure, after acquiring the recognition character string matching with the speech information, at least one entity vocabulary corresponding to the recognition character in the recognition character string is acquired from the entity vocabulary library, and the matched entity vocabulary is determined as the semantic determining result of the speech information based on the hit of the entity vocabulary to the recognition character string. Thus, in the case of not acquiring the exactly matched entity vocabulary, the matched entity vocabulary may still be determined based on the entity vocabulary library, and then semantic information of a speech may be accurately understood. At the same time, strong fault-tolerance for a wrong word, an extra word or a missing word improves the accuracy of semantic determining of the speech information.

Figure 2A:
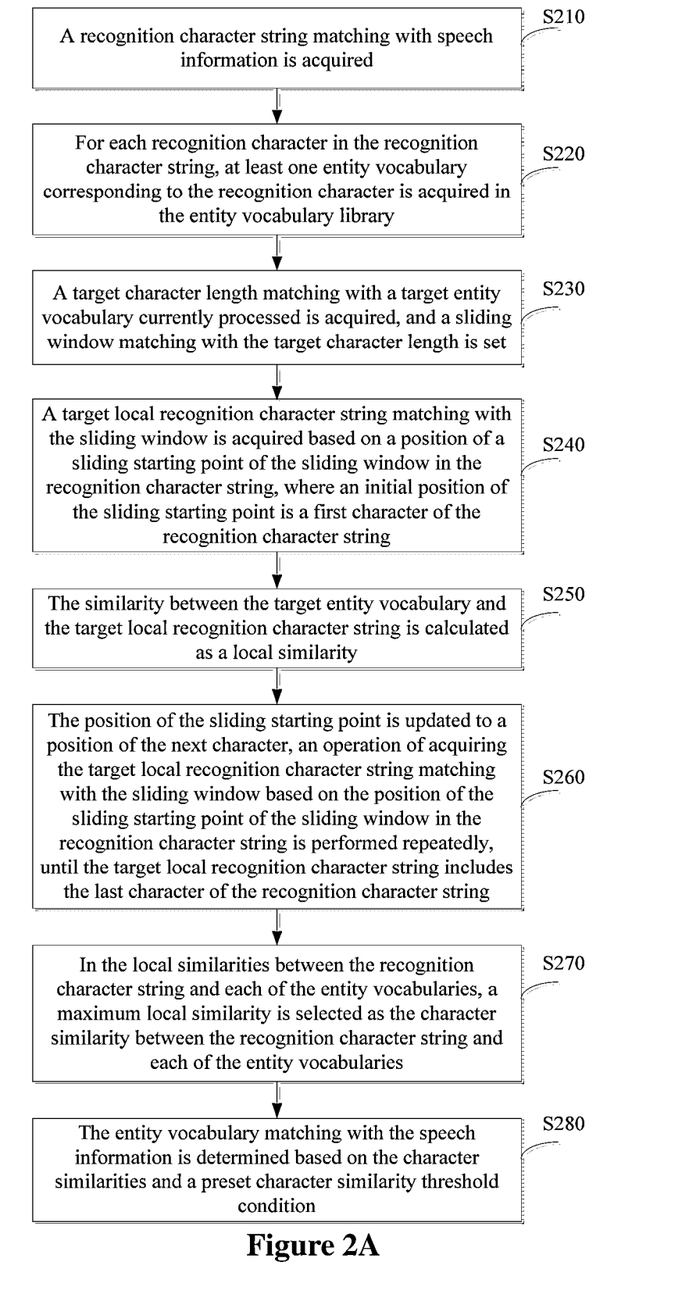
FIG. 2A is a flowchart of a semantic determining method according to a second embodiment of the present disclosure.

FIG. 2A is a flowchart of the semantic determining method according to a second embodiment of the present disclosure. This embodiment is specified on the basis of the above technical solution. In the embodiment of the present invention, the character similarity between the entity vocabulary and the recognition character string is acquired through a sliding window. In this case, the entity vocabulary matching with the speech information is determined based on a preset character similarity threshold condition and the character similarity between the recognition character string and the entity vocabulary. The method includes the following S210 to S280.

In S210, the recognition character string matching with the speech information is acquired.

In S220, for each recognition character in the recognition character string, at least one entity vocabulary corresponding to the recognition character is acquired in the entity vocabulary library.

In S230, a target character length matching with a target entity vocabulary currently processed is acquired, and a sliding window matching with the target character length is set.

The sliding window is a flow control technology, in which the transmission amount of byte data is managed by the size of the set sliding window. In an embodiment of the present invention, the sliding window is configured to traverse the recognition character string, to ensure that the number of characters in the sliding window is equal to that of the target entity vocabulary currently processed, or that the number of characters in the sliding window reaches a maximum number of characters in the recognition character string, Therefore, the length of the sliding window matches with the character length of the entity vocabulary currently processed. For example, if the entity vocabulary currently processed is "Bright light of the moon in front of my bed ( 床前明月光 in Chinese)", the length of the corresponding sliding window is 5 characters. If the entity vocabulary currently processed is "Hard is the way to Shu ( 蜀道难 in Chinese)", the length of the corresponding sliding window is 3 characters. In particular, the sliding window may be controlled in a parallel way. That is, each acquired entity vocabulary may be assigned a corresponding sliding window. Respective entity vocabularies may be traversed simultaneously through the corresponding sliding windows. Alternatively, the sliding window may be controlled in a serial way. That is, the recognition character string is traversed through one sliding window, and compared with each of the entity vocabularies in turn. In the embodiment of the present invention, the control mode of the sliding window is not specifically limited.

In S240, a target local recognition character string matching with the sliding window is acquired based on a position of a sliding starting point of the sliding window in the recognition character string, where an initial position of the sliding starting point is a first character of the recognition character string.

The recognition character string is traversed through the sliding window from left to right. The sliding starting point of the sliding window is located at a position of the left end point of the sliding window in the recognition character string. For example, the length of the sliding window is 5 characters, and the current left end point is located at the position of a third character of the recognition character string ""Bright and clear light in front of my bed"'s next sentence" ( 床前明亮光的下句 in Chinese). In this case, the position of the third character of the recognition character string is the sliding starting point, and the corresponding target local recognition character string is "clear light in front of my bed"'s next" ( 明亮光的下 in Chinese). The initial position of the sliding window is the position of the first character, and the corresponding target local recognition character string is "Bright and clear light in front of my bed".

In S250, the similarity between the target entity vocabulary and the target local recognition character string is calculated as a local similarity.

Taking the above technical solution as an example, the similarity between the entity vocabulary "Bright light of the moon in front of my bed" and the local recognition character string "Bright and clear light in front of my bed" is calculated. The number of the same characters between the entity vocabulary "Bright light of the moon in front of my bed" and the local recognition character string "Bright and clear light in front of my bed" is 4, and the entity vocabulary "Bright light of the moon in front of my bed" includes 5 characters, and thus the local similarity acquired is 4/5, that is, 80%.

In S260, the position of the sliding starting point is updated to a position of the next character, an operation of acquiring the target local recognition character string matching with the sliding window based on the position of the sliding starting point of the sliding window in the recognition character string is performed repeatedly, until the target local recognition character string includes the last character of the recognition character string.

Taking the above technical solution as an example, the position of the sliding starting point is updated to the position of the next character. That is, the local recognition character string "clear light in front of my bed"'s" ( 前明亮光的 in Chinese) is obtained, and the corresponding local similarity is 3/5, that is, 60%. Then, the local recognition character string "in front of my bed"'s next" ( 明亮光的下 in Chinese) is acquired, the corresponding local similarity is 2/5, that is, 40%, until the local recognition character string "of my bed"'s next sentence" ( 亮光的下句 in Chinese) is acquired, the corresponding local similarity is 1/5, that is, 20%. At this time, the target local recognition character string has included the last character of the recognition character string. In such case, all local recognition character strings matching with the entity vocabulary in the recognition character string have been acquired.

In S270, in the local similarities between the recognition character string and each of the entity vocabularies, the maximum local similarity is selected as the character similarity between the recognition character string and each of the entity vocabularies.

Taking the above technical solution as an example, the local similarity between the entity vocabulary "Bright light of the moon in front of my bed" and the recognition character string is 80%, 60%, 40% and 20% respectively. The maximum local similarity, that is, 80%, is selected as the character similarity between the recognition character string and the entity vocabulary "Bright light of the moon in front of my bed". In the same way, the local similarity between the entity vocabulary "The bright moon shines on the pines" and the recognition character string is 20%, 20%, 20% and 0% respectively. The maximum local similarity, that is, 20%, is selected as the character similarity between the recognition character string and the entity vocabulary "The bright moon shines on the pines". The local similarity between the entity vocabulary "What time does the bright moon appear" and the recognition character string is 20%, 20%, 20% and 0% respectively, and the maximum local similarity, that is, 20% is selected as the character similarity between the recognition character string and the entity vocabulary "What time does the bright moon appear".

In S280, the entity vocabulary matching with the speech information is determined based on the character similarities and a preset character similarity threshold condition.

The matched relationship between the recognition character string and the entity vocabulary is not only affected by the character similarity, but also related to the character length of the entity vocabulary. Therefore, the preset character similarity threshold conditions include a corresponding relationship between the character length of the entity vocabulary and a character similarity threshold. Different character lengths of the entity vocabulary may correspond to different character similarity thresholds. For example, for the entity vocabulary with a character length of less than or equal to 3 characters, the character similarity threshold condition is set to 100%. That is, only when the entity vocabulary completely corresponds to the local recognition character string in the recognition character string, the entity vocabulary can be used as the semantic determining result of the speech information. For the entity vocabulary with a character length of more than or equal to 4 characters, the character similarity threshold condition is set to 80%. That is, when the similarity between the entity vocabulary and the local recognition character string in the recognition character string reaches more than 80%, the entity vocabulary may be used as the semantic determining result of the speech information.

In an embodiment of the present invention, after the similarity between the target entity vocabulary and the target local recognition character string is calculated as the local similarity, the method further includes: recording the position of the sliding starting point and the size of the sliding window. The matched entity vocabulary is determined as the semantic determining result of the speech information further based on the hit of the entity vocabulary to the recognition character string, by acquiring the position of the sliding starting point and the size of the sliding window corresponding to the target character similarity based on the target character similarity corresponding to the matched entity vocabulary; adding the acquired position of the sliding starting point and the acquired size of the sliding window to the semantic determining result as remark information. After the matched entity vocabulary is acquired, the position of the sliding starting point and the size of the sliding window corresponding to the target character similarity may be added to the semantic determining result to describe detailed information of the entity vocabulary. In this way, the returned semantic determining result includes not only the acquired entity vocabulary, but also the corresponding relationship between the entity vocabulary and the recognition character string. For example, taking the above technical solution as an example, the sliding starting point corresponding to the finally matched entity vocabulary "Bright light of the moon in front of my bed" is the first character, and a sliding end point is a fifth character (that is, "Bright light of the moon in front of my bed" corresponds to "Bright and clear light in front of my bed" in ""Bright and clear light in front of my bed"'s next sentence").

In the technical solution of the embodiment of the present disclosure, after the recognition character string matching with the speech information is acquired, for each recognition character in the recognition character string, at least one entity vocabulary corresponding to the recognition character is acquired from the entity vocabulary library, and the similarity between the entity vocabulary and the recognition character string is acquired through the sliding window. In this way, in the case of not acquiring the exactly matched entity vocabulary, the matched entity vocabulary may be determined based on the entity vocabulary library, and then the semantic information of the speech may be accurately understood. In addition, the entity vocabulary that matches with the speech information is determined, based on the character similarity between the recognition character string and the entity vocabulary, as well as the preset character similarity threshold condition, which avoids the influence of the character length of the entity vocabulary on the matching result and improves the accuracy of semantic determining of the speech information.

First Specific Application Scenario

Figure 2B:
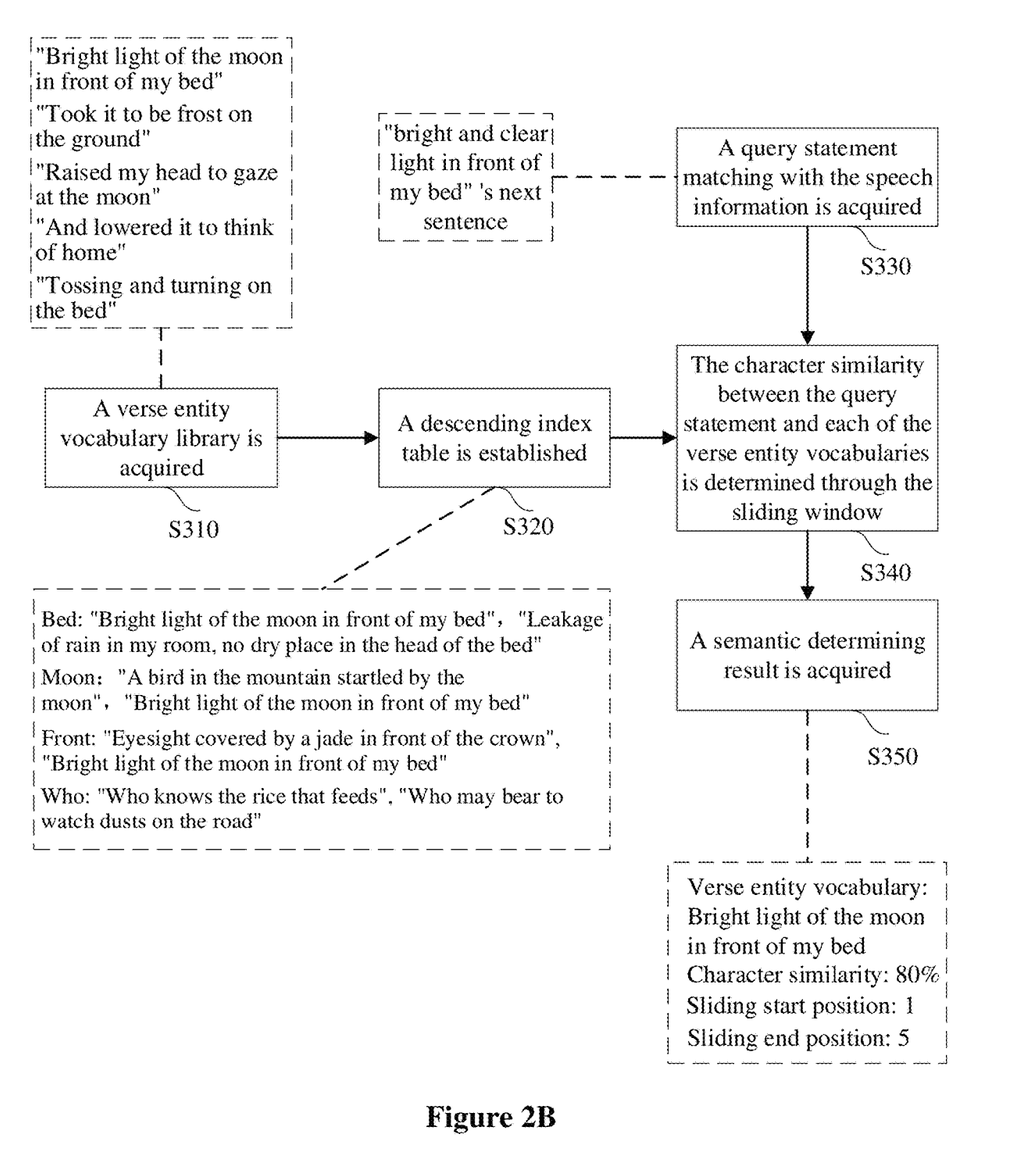
FIG. 2B is a flowchart of a semantic determining method according to a specific first application scenario of the present disclosure.

FIG. 2B is a flowchart of a semantic determining method according to a first specific application scenario of the present disclosure. The method includes the following S301 to S305.

In S310, a verse entity vocabulary library is acquired.

The verse entity vocabulary library includes "Took it to be frost on the ground", "Raised my head to gaze at the moon", "And lowered it to think of home", "Tossing and turning on the bed" and other many verse entity vocabularies.

In S320, a descending index table is established based on the verse entity vocabularies in the verse entity vocabulary library, where the descending index table includes multiple key-value pairs, the key name in the key-value pair is a character, and the value in the key-value pair is at least one verse entity vocabulary containing the character.

For example, the values corresponding to the key name "bed" include "Bright light of the moon in front of my bed" and "Leakage of rain in my room, no dry place in the head of the bed". The values corresponding to the key name "moon" include "A bird in the mountain startled by the moon" and "Bright light of the moon in front of my bed". The values corresponding to the key name "front" include "Eyesight covered by a jade in front of the crown" and "Bright light of the moon in front of my bed". The values corresponding to the key name "who" include "Who knows the rice that feeds" and "Who may bear to watch dusts on the road".

In S330, a query statement matching with the speech information is acquired.

For example, the matched query statement acquired through the speech recognition technology is ""bright and clear light in front of my bed"'s next sentence".

In S340, The character similarity between the query statement and each of the verse entity vocabularies is determined through the sliding window.

Specifically, the target character length that matches with the target entity vocabulary currently processed is acquired, and a sliding window matching with the target character length is set. Based on the position of the sliding starting point of the sliding window in the query statement, a target local query statement matching with the sliding window is acquired. The initial position of the sliding starting point is the first character of the query statement. The similarity between the target entity vocabulary and the target local query statement is calculated as a local similarity. The position of the sliding starting point is updated to a position of the next character. The operation of acquiring the target local query statement matching with the sliding window based on the position of the sliding starting point of the sliding window in the query statement is performed repeatedly, until the target local query statement includes a last character of the query statement. From the local similarities between the query statement and each of the entity vocabularies, the maximum local similarity is selected as the character similarity between the query statement and each of the entity vocabularies. For example, it is determined that the character similarity between the query statement and "Bright light of the moon in front of my bed" is 80%.

In S350, The verse entity vocabulary matching with the query statement is determined as a semantic determining result of the query statement, and the sliding start position and sliding end position of the sliding window is recorded.

For example, based on the character similarity, the verse entity vocabulary that matches with the query statement is determined as "Bright light of the moon in front of my bed". The sliding starting point position is recorded as a first character, and the sliding end position is recorded as a fifth character.

In the technical solution of the embodiment of the present disclosure, a descending index table is established based on the verse entity vocabularies in the verse entity vocabulary library. After the query statement is acquired, the character similarity between the query statement and each of the verse entity vocabularies is determined through the sliding window. Then, the entity vocabulary matching with the query statement is determined as the semantic determining result of the query statement, and the sliding start position and sliding end position of the sliding window are recorded. In this way, in the case of not acquiring the exactly matched entity vocabulary, the matched verse entity vocabulary may be determined based on the verse entity vocabulary library, and then the semantic information of the speech is accurately understood. In addition, strong fault-tolerance for a wrong word, an extra word or a missing word improves the accuracy of semantic determining of the speech information.

Figure 3:
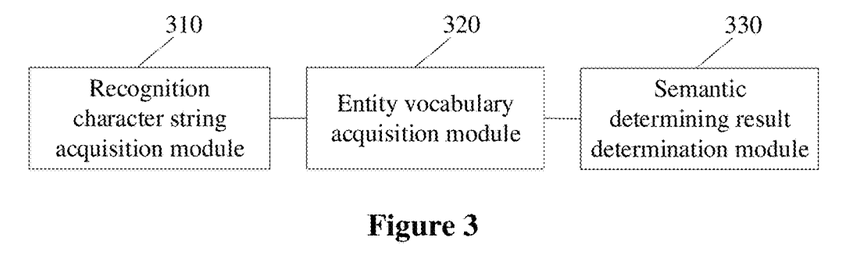
FIG. 3 is a structural block diagram of a semantic determining apparatus according to a third embodiment of the present disclosure.

FIG. 3 is a structural block diagram of a semantic determining apparatus according to a third embodiment of the present disclosure. The semantic determining apparatus includes a recognition character string acquisition module 310, an entity vocabulary acquisition module 320 and a semantic determining result determination module 330.

The recognition character string acquisition module 310 is configured to acquire a recognition character string matching with speech information.

The entity vocabulary acquisition module 320 is configured to acquire, for each recognition character in the recognition character string, at least one entity vocabulary corresponding to the recognition character, in the entity vocabulary library.

The semantic determining result determination module 330 is configured to determine a matched entity vocabulary as a semantic determining result of the speech information, based on a hit of the entity vocabulary to the recognition character string.

In the technical solution of the embodiment of the present disclosure, after the recognition character string matching with the speech information is acquired, for each recognition character in the recognition character string, at least one entity vocabulary corresponding to the recognition character in the recognition character string is acquired from the entity vocabulary library, and the matched entity vocabulary is determined as the semantic determining result of the speech information based on the hit of the entity vocabulary to the recognition character string. Thus, in the case of not acquiring the exactly matched entity vocabulary, the matched entity vocabulary may be determined based on the entity vocabulary library, and then the semantic information of the speech may be accurately understood. In addition, strong fault-tolerance for a wrong word, an extra word or a missing word improves the accuracy of semantic determining of the speech information.

Optionally, on the basis of the above technical solution, the semantic determining apparatus further includes: a descending index table establishment module configured to establish a descending index table matching with the entity vocabulary library, based on entity vocabularies in the entity vocabulary library, wherein the descending index table includes multiple key-value pairs, each of the key-value pairs includes a key name which is a character, and a value which is at least one entity vocabulary containing the character.

Optionally, on the basis of the above technical solution, the entity vocabulary acquisition module 320 is configured to query the descending index table matching with the entity vocabulary library, and acquire the at least one entity vocabulary corresponding to the recognition character in the recognition character string.

Optionally, on the basis of the above technical solution, the semantic determining result determination module 330 includes: a local similarity acquisition unit and an entity vocabulary determination unit.

The local similarity acquisition unit is configured to traverse, based on a character length of the entity vocabulary, local recognition character strings matching with the character length in the recognition character string; and calculate a local similarity between each of the local recognition character strings and the matched entity vocabulary.

The entity vocabulary determination unit is configured to determine the entity vocabulary matching with the speech information, based on the local similarities between the recognition character string and each of the entity vocabularies.

Optionally, on the basis of the above technical solution, the local similarity acquisition unit includes: a sliding window setting sub-unit, a local recognition character string acquisition sub-unit, a similarity calculation sub-unit, and a sliding starting point position update sub-unit.

The sliding window setting sub-unit is configured to acquire a target character length matching with a target entity vocabulary currently processed, and set a sliding window matching with the target character length.

The local recognition character string acquisition sub-unit is configured to acquire a target local recognition character string matching with the sliding window, based on a position of a sliding starting point of the sliding window in the recognition character string, where an initial position of the sliding starting point is a first character of the recognition character string.

The similarity calculation sub-unit is configured to calculate a similarity between the target entity vocabulary and the target local recognition character string as the local similarity.

The sliding starting point position update sub-unit is configured to update the position of the sliding starting point to a position of a next character; and return to an operation of acquiring the target local recognition character string matching with the sliding window based on the position of the sliding starting point of the sliding window of in the recognition character string, until the target local recognition character string includes a last character of the recognition character string.

Optionally, on the basis of the above technical solution, the entity vocabulary determination unit includes: a maximum local similarity acquisition sub-unit and an entity vocabulary determination sub-unit.

The maximum local similarity acquisition sub-unit is configured to select a maximum local similarity from the local similarities between the recognition character string and each of the entity vocabularies, as a character similarity between the recognition character string and the entity vocabulary;

The entity vocabulary determination sub-unit is configured to determine the entity vocabulary matching with the speech information, based on the character similarity and a preset character similarity threshold condition.

Optionally, on the basis of the above technical solution, the semantic determining apparatus further includes: a recording execution module configured to record the position of the sliding starting point and a size of the sliding window.

Optionally, on the basis of the above technical solution, the semantic determining result determination module 330 further includes: a position and window size acquisition unit and a position and window size determination unit.

The position and window size acquisition unit is configured to acquire the position of the sliding starting point and the size of the sliding window corresponding to a target character similarity, based on the target character similarity corresponding to the matched entity vocabulary.

The position and window size determination unit is configured to add the acquired position of the sliding starting point and the acquired size of the sliding window to the semantic determining result as remark information.

Optionally, on the basis of the above technical solution, the semantic determining apparatus further includes: an effective recognition character acquisition module configured to acquire effective recognition characters in the recognition character string, based on the recognition character string and a preset invalid character list.

Optionally, on the basis of the above technical solution, the entity vocabulary acquisition module 320 is further configured to acquire, for each of the effective recognition characters in the recognition character string, at least one entity vocabulary corresponding to the effective recognition character in the entity vocabulary library.

The above apparatus may perform the semantic determining method according to any embodiment of the present disclosure, and has corresponding functional modules and beneficial effects to perform the method. Technical details not described in detail in this embodiment can refer to the method according to any embodiment of this disclosure.

Figure 4:
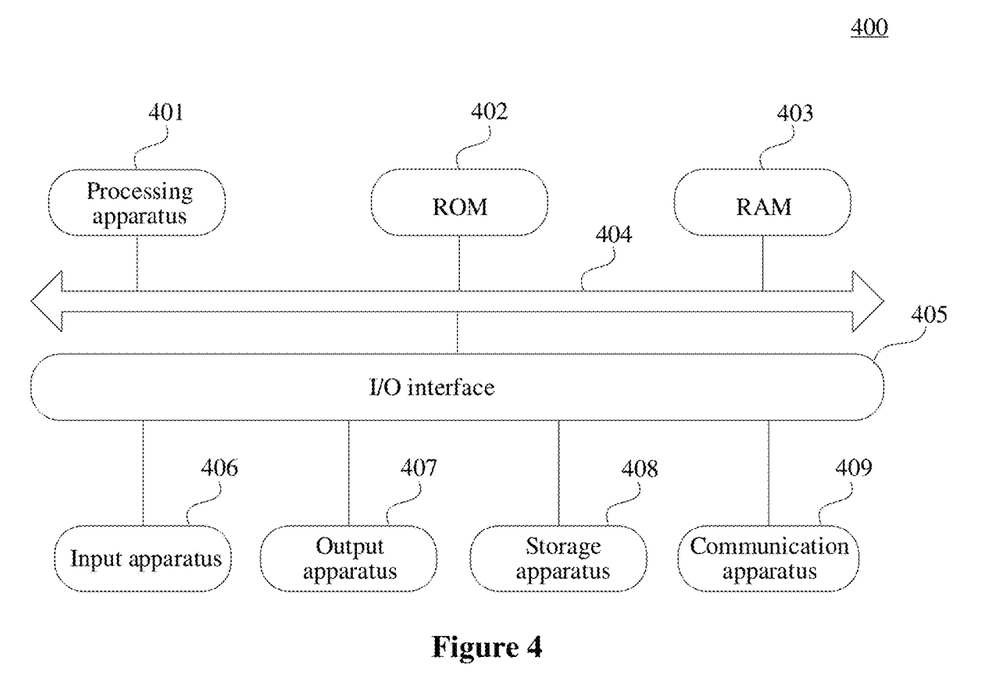
FIG. 4 is a structural block diagram of an electronic device according to a fourth embodiment of the present disclosure.

FIG. 4 shows a schematic structural diagram of an electronic device (such as the terminal device or the server in FIG. 1) 400 suitable for implementing an embodiment of the present disclosure. The terminal device in the embodiment of the present disclosure may include, but are not limited to, mobile phones, laptops, digital broadcast receivers, PDAs (personal digital assistants), PADs (tablets), PMPs (portable multimedia players), vehicle-mounted terminals (such as in-vehicle navigation terminals), and other mobile phone terminals and fixed terminals such as digital TVs, desktop computers, and the like. The electronic device shown in FIG. 4 is only exemplary, and should not indicate any limitation to the functions and scope of application of the embodiments of the present disclosure.

As shown in FIG. 4, the electronic device 400 may include a processing apparatus 401, such as a central processor (CPU) or a graphics processor, which may execute various operations and processing based on a program stored in a Read Only Memory (ROM) 402 or a program loaded from a storage apparatus 408 into a Random Access Memory (RAM) 403. The RAM 403 is further configured to store various programs and data required by the electronic device 400. The processing apparatus 401, the ROM 402 and the RAM 403 are connected to each other through a bus 404. An Input/output (I/O) interface 405 is also connected to the bus 404.

Generally, the I/O interface 405 may be connected to: an input apparatus 406, such as a touch screen, a touch panel, a keyboard, a mouse, a camera, a microphone, an accelerometer, and a gyroscope; an output apparatus 407, such as a liquid crystal display (LCD), a speaker, and a vibrator; a storage apparatus 408 such as a magnetic tape and a hard disk; and a communication apparatus 409. The communication apparatus 409 enables wireless or wired communication between the electronic device 400 and other devices for data exchanging. Although FIG. 4 shows an electronic device 400 having various components, it should be understood that the illustrated components are not necessarily required to all be implemented or embodied. Alternatively, more or fewer devices may be implemented or included.

Particularly, according to an embodiment of the present disclosure, the process described above in conjunction with flow charts may be implemented as a computer program. For example, a computer program product is further provided as an embodiment in the present disclosure, including a computer program carried on a non-transient computer readable medium. The computer program includes program code for performing the method shown in the flowchart. In the embodiment, the computer program may be downloaded and installed from the network via the communication apparatus 409, or installed from the storage 406, or installed from the ROM 402. When the computer program is executed by the processing apparatus 401, the functions defined in the method according to the embodiment of the present disclosure are performed.

It is to be noted that, the computer readable medium mentioned herein may be a computer readable signal medium or a computer readable storage medium or any combination thereof. The computer readable storage medium may be but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage apparatus or any proper combination thereof. In the embodiment of the present disclosure, the computer readable storage medium may be any tangible medium containing or storing a program, and the program may be used by or in combination with an instruction execution system, apparatus, or device. In the embodiment of the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to: a wire, an optical cable, radio frequency and the like, or any proper combination thereof.

In some embodiments, the client and server may communicate using any currently known or future developed network protocol such as HTTP (Hyper Text Transfer Protocol), and may be interconnected with any form or medium of digital data communication (e.g., a communication network). Examples of the communication network include local area networks ("LANs"), wide area networks ("WANs"), the Internet (e.g., the Internet), and end-to-end networks (e.g., ad hoc end-to-end networks), as well as any currently known or future developed networks.

The computer-readable medium may be included in the electronic device; or may exist alone without being assembled into the electronic device.

The computer-readable medium carries one or more programs. The one or more programs, when executed by the electronic device, cause the electronic device: to acquire a recognition character string matching with the speech information; acquire, for each recognition character in the recognition character string, at least one entity vocabulary corresponding to the recognition character in an entity vocabulary library; determine, based on a hit of the entity vocabulary to the recognition character string, a matched entity vocabulary as a semantic determining result of the speech information.

The computer program code for performing the operations disclosed in the embodiments of the present disclosure may be written in one or more programming languages or combinations thereof. The programming languages include but not limited to, an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flow charts and block diagrams in the drawings illustrate the architecture, functions and operations that can be implemented by the system, method and computer program product according to the embodiments of the present disclosure. Each block in a flowchart or a block diagram may represent a module, a program segment, or a part of code, and part of the module, program segment, or part of code contains one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the block in the block diagram and/or flowchart and a combination of the blocks in the block diagram and/or flowchart may be implemented by a dedicated hardware-based system that performs specified functions or actions, or may be realized by a combination of dedicated hardware and computer instructions.

The units mentioned in the description of the embodiments of the present disclosure may be implemented by means of software, or otherwise by means of hardware. The name of the unit does not constitute a limitation of the unit itself in some cases. For example, the recording execution module may be described as "configured to record the position of the sliding starting point and the size of the sliding window". The functions described above herein may be performed at least in part by one or more hardware logic components. For example, For example, without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the present disclosure, a machine readable medium may be a tangible medium, which may contain or store a program used by the instruction execution system, apparatus, or device or a program used in combination with the instruction execution system, apparatus, or device. The machine readable medium may be a machine readable signal medium or a machine readable storage medium. The machine readable medium may include, but is not limited to, system, an apparatus, or a device in an electronic, magnetic, optical, electromagnetic, infrared, or semi-conductive form, or any suitable combination thereof. More specific examples of the machine readable storage medium may include, one or more wire based electrical connections, a portable computer disk, a hard disk, a random access memory (RAM), a read-only memory (ROM), an erasable programmable read-only memory (EPROM or Fast flash memory), an optical fiber, a portable compact disc read-only memory (CD-ROM), an optical storage device, a magnetic storage device or any proper suitable combination thereof.

According to one or more embodiments of the present disclosure, a semantic determining method is provided in a first example. The semantic determining method includes:

acquiring a recognition character string matching with speech information;

acquiring, for each recognition character in the recognition character string, at least one entity vocabulary corresponding to the recognition character in an entity vocabulary library; and determining, based on a hit of the entity vocabulary to the recognition character string, a matched entity vocabulary as a semantic determining result of the speech information.

According to one or more embodiments of the present disclosure, the method of the first example is provided in a second example. The method further includes:

establishing a descending index table matching with the entity vocabulary library, based on entity vocabularies in the entity vocabulary library, where the descending index table includes a plurality of key-value pairs, each of the key-value pairs includes a key name which is a character, and a value which is at least one entity vocabulary containing the character; and querying the descending index table matching with the entity vocabulary library, and acquiring at least one entity vocabulary corresponding to the recognition character in the recognition character string.

According to one or more embodiments of the present disclosure, the method of the first example is provided in a third example. The method further includes:

traversing, based on a character length of each of the entity vocabularies, local recognition character strings matching with the character length in the recognition character string; and calculating local similarities between the local recognition character strings and the matched entity vocabulary; and determining the entity vocabulary matching with the speech information, based on the local similarities between the recognition character string and each of the entity vocabularies.

According to one or more embodiments of the present disclosure, the method of the third example is provided in a fourth example. The method further includes:

acquiring a target character length matching with a target entity vocabulary currently processed, and setting a sliding window matching with the target character length;

acquiring, based on a position of a sliding starting point of the sliding window in the recognition character string, a target local recognition character string matching with the sliding window, wherein an initial position of the sliding starting point is a first character of the recognition character string;

calculating a similarity between the target entity vocabulary and the target local recognition character string as a local similarity; and updating the position of the sliding starting point to a position of a next character, returning to an operation of acquiring the target local recognition character string matching with the sliding window based on the position of the sliding starting point of the sliding window in the recognition character string, until the target local recognition character string includes a last character of the recognition character string.

According to one or more embodiments of the present disclosure, the method of the fourth example is provided in a fifth example. The method further includes:

selecting a maximum local similarity from the local similarities between the recognition character string and each of the entity vocabularies, as a character similarity between the recognition character string and each of the entity vocabularies; and determining, based on the character similarity and a preset character similarity threshold condition, the entity vocabulary matching with the speech information.

According to one or more embodiments of the present disclosure, the method of the fifth example is provided in a sixth example. The method further includes:

recording the position of the sliding starting point and a size of the sliding window;

acquiring, based on the target character similarity corresponding to the matched entity vocabulary, the position of the sliding starting point and the size of the sliding window corresponding to the target character similarity; and adding the acquired position of the sliding starting point and the acquired size of the sliding window to the semantic determining result as remark information.

According to one or more embodiments of the present disclosure, the method of the first example is provided in a seventh example. The method further includes:

acquiring valid recognition characters in the recognition character string, based on the recognition character string and a preset invalid character list; and acquiring, for each of the effective recognition characters in the recognition character string, at least one entity vocabulary corresponding to the effective recognition character in the entity vocabulary library.

According to one or more embodiments of the present disclosure, a semantic determining apparatus is provided in an eighth example. The semantic determining apparatus further includes:

a recognition character string acquisition module configured to acquire a recognition character string matching with speech information;

an entity vocabulary acquisition module configured to acquire, for each recognition character in the recognition character string, at least one entity vocabulary corresponding to the recognition character in an entity vocabulary library; and a semantic determining result determination module configured to determine a matched entity vocabulary as a semantic determining result of the speech information, based on a hit of each entity vocabulary to the recognition character string.

According to one or more embodiments of the present disclosure, an electronic device is provided in a ninth example. The electronic device includes: a memory, a processing device, and a computer program stored on the memory and executable on the processing device, wherein the processing device, when executing the program, implements the semantic determining method according to any one of the first to seventh examples.

According to one or more embodiments of the present disclosure, a storage medium containing computer executable instructions is provided in a tenth example, where the computer executable instructions, when executed by a computer processor, implements the semantic determining method according to any one of the first to seventh examples.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

In addition, although the above operations are described in a specific order, it should not be understood that these operations are required to be performed in the specific order or performed in a sequential order. In some conditions, multitasking and parallel processing may be advantageous. Although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A semantic determining method, comprising:
   acquiring, using a trained speech recognition model, a recognition character string matching with speech information;
   acquiring, for each recognition character in the recognition character string, at least one entity vocabulary corresponding to the recognition character in an entity vocabulary library; and
   determining, based on a hit of each entity vocabulary to the recognition character string, a matched entity vocabulary as a semantic determining result of the speech information,
   wherein before acquiring the recognition character string matching with the speech information, the method further comprises:
   establishing a descending index table matching with the entity vocabulary library, based on entity vocabularies in the entity vocabulary library, wherein the descending index table includes a plurality of key-value pairs, each of the key-value pairs includes a key name which is a character, and a value which is at least one entity vocabulary containing the character; and
   the acquiring, for each recognition character in the recognition character string, at least one entity vocabulary corresponding to the recognition character in an entity vocabulary library comprising:
   querying the descending index table matching with the entity vocabulary library, and acquiring the at least one entity vocabulary corresponding to the recognition character in the recognition character string.

2. The method according to claim 1, wherein in a case that the entity vocabularies and the recognition character string have the same number of characters, the determining, based on a hit of each entity vocabulary to the recognition character string, a matched entity vocabulary as a semantic determining result of the speech information comprises:
   calculating, for each entity vocabulary, a similarity between the entity vocabulary and the recognition character string, based on the number of the same characters between the entity vocabulary and the recognition character string; and
   determining, based on the similarity between the entity vocabulary and the recognition character string, the entity vocabulary matching with the speech information.

3. The method according to claim 1, wherein in a case that the entity vocabularies and the recognition character string have different numbers of characters, the determining, based on a hit of each entity vocabulary to the recognition character string, a matched entity vocabulary as a semantic determining result of the speech information comprises:
   traversing, based on a character length of each of the entity vocabularies, local recognition character strings matching with the character length in the recognition character string; and calculating local similarities between the local recognition character strings and the matched entity vocabulary; and
   determining the entity vocabulary matching with the speech information, based on the local similarities between the recognition character string and each of the entity vocabularies.

4. The method according to claim 3, wherein the traversing, based on a character length of each of the entity vocabularies, local recognition character strings matching with the character length in the recognition character string, and calculating local similarities between the local recognition character strings and the matched entity vocabulary comprises:
   acquiring a target character length matching with a target entity vocabulary currently processed, and setting a sliding window matching with the target character length;
   acquiring, based on a position of a sliding starting point of the sliding window in the recognition character string, a target local recognition character string matching with the sliding window, wherein an initial position of the sliding starting point is a first character of the recognition character string;
   calculating a similarity between the target entity vocabulary and the target local recognition character string as a local similarity; and
   updating the position of the sliding starting point to a position of a next character, returning to an operation of acquiring the target local recognition character string matching with the sliding window based on the position of the sliding starting point of the sliding window in the recognition character string, until the target local recognition character string includes a last character of the recognition character string.

5. The method according to claim 4, wherein the determining the entity vocabulary matching with the speech information, based on the local similarities between the recognition character string and each of the entity vocabularies comprises:
   selecting a maximum local similarity from the local similarities between the recognition character string and each of the entity vocabularies, as a character similarity between the recognition character string and each of the entity vocabularies; and
   determining, based on the character similarity and a preset character similarity threshold condition, the entity vocabulary matching with the speech information.

6. The method according to claim 5, wherein the preset character similarity threshold condition comprises a correspondence between a character length of the entity vocabulary and a character similarity threshold.

7. The method according to claim 5, wherein after calculating a similarity between the target entity vocabulary and the target local recognition character string as a local similarity, the method further comprises:
   recording the position of the sliding starting point and a size of the sliding window; and
   the determining, based on a hit of each entity vocabulary to the recognition character string, a matched entity vocabulary as a semantic determining result of the speech information further comprises:
   acquiring, based on a target character similarity corresponding to the matched entity vocabulary, the position of the sliding starting point and the size of the sliding window corresponding to the target character similarity; and adding the acquired position of the sliding starting point and the acquired size of the sliding window to the semantic determining result as remark information.

8. The method according to claim 1, wherein before acquiring, for each recognition character in the recognition character string, at least one entity vocabulary corresponding to the recognition character in the entity vocabulary library, the method further comprises:
acquiring valid recognition characters in the recognition character string based on the recognition character string and a preset invalid character list; and
the acquiring, for each recognition character in the recognition character string, at least one entity vocabulary corresponding to the recognition character in the entity vocabulary library comprises:
acquiring, for each of the effective recognition characters in the recognition character string, at least one entity vocabulary corresponding to the effective recognition character in the entity vocabulary library.

9. An electronic device, comprising:
a memory,
a processing device; and
a computer program stored on the memory and executable on the processing device, wherein the computer program, when executed by the processing device, causes the processing device to:
acquire, using a trained speech recognition model, a recognition character string matching with speech information;
acquire, for each recognition character in the recognition character string, at least one entity vocabulary corresponding to the recognition character in an entity vocabulary library; and
determine, based on a hit of each entity vocabulary to the recognition character string, a matched entity vocabulary as a semantic determining result of the speech information,
wherein the computer program, when executed by the processing device, causes the processing device to:
establish a descending index table matching with the entity vocabulary library, based on entity vocabularies in the entity vocabulary library, wherein the descending index table includes a plurality of key-value pairs, each of the key-value pairs includes a key name which is a character, and a value which is at least one entity vocabulary containing the character; and
query the descending index table matching with the entity vocabulary library, and acquire the at least one entity vocabulary corresponding to the recognition character in the recognition character string.

10. The electronic device according to claim 9, wherein in a case that the entity vocabularies and the recognition character string have the same number of characters, the computer program, when executed by the processing device, causes the processing device to:
calculate, for each entity vocabulary, a similarity between the entity vocabulary and the recognition character string, based on the number of the same characters between the entity vocabulary and the recognition character string; and
determine, based on the similarity between the entity vocabulary and the recognition character string, the entity vocabulary matching with the speech information.

11. The electronic device according to claim 9, wherein in a case that the entity vocabularies and the recognition character string have different numbers of characters, the the computer program, when executed by the processing device, causes the processing device to:
traverse, based on a character length of each of the entity vocabularies, local recognition character strings matching with the character length in the recognition character string; and
calculate local similarities between the local recognition character strings and the matched entity vocabulary; and
determine the entity vocabulary matching with the speech information, based on the local similarities between the recognition character string and each of the entity vocabularies.

12. The electronic device according to claim 11, wherein the computer program, when executed by the processing device, causes the processing device to:
acquire a target character length matching with a target entity vocabulary currently processed, and set a sliding window matching with the target character length;
acquire, based on a position of a sliding starting point of the sliding window in the recognition character string, a target local recognition character string matching with the sliding window, wherein an initial position of the sliding starting point is a first character of the recognition character string;
calculate a similarity between the target entity vocabulary and the target local recognition character string as a local similarity; and
update the position of the sliding starting point to a position of a next character, return to an operation of acquiring the target local recognition character string matching with the sliding window based on the position of the sliding starting point of the sliding window in the recognition character string, until the target local recognition character string includes a last character of the recognition character string.

13. The electronic device according to claim 12, wherein the computer program, when executed by the processing device, causes the processing device to:
select a maximum local similarity from the local similarities between the recognition character string and each of the entity vocabularies, as a character similarity between the recognition character string and each of the entity vocabularies; and
determine, based on the character similarity and a preset character similarity threshold condition, the entity vocabulary matching with the speech information.

14. The electronic device according to claim 13, wherein the preset character similarity threshold condition comprises a correspondence between a character length of the entity vocabulary and a character similarity threshold.

15. The electronic device according to claim 13, wherein the computer program, when executed by the processing device, causes the processing device to:
record the position of the sliding starting point and a size of the sliding window;
acquire, based on a target character similarity corresponding to the matched entity vocabulary, the position of the sliding starting point and the size of the sliding window corresponding to the target character similarity; and
add the acquired position of the sliding starting point and the acquired size of the sliding window to the semantic determining result as remark information.

16. The electronic device according to claim 9, wherein the computer program, when executed by the processing device, causes the processing device to:

acquire valid recognition characters in the recognition character string based on the recognition character string and a preset invalid character list; and acquire, for each of the effective recognition characters in the recognition character string, at least one entity vocabulary corresponding to the effective recognition character in the entity vocabulary library.

17. A non-transitory storage medium containing computer executable instructions, wherein the instructions, when executed by a computer processor, cause the computer processor to acquire, using a trained speech recognition model, a recognition character string matching with speech information;

acquire, for each recognition character in the recognition character string, at least one entity vocabulary corresponding to the recognition character in an entity vocabulary library; and determine, based on a hit of each entity vocabulary to the recognition character string, a matched entity vocabulary as a semantic determining result of the speech information, wherein the instructions, when executed by a computer processor, cause the computer processor to:

establish a descending index table matching with the entity vocabulary library, based on entity vocabularies in the entity vocabulary library, wherein the descending index table includes a plurality of key-value pairs, each of the key-value pairs includes a key name which is a character, and a value which is at least one entity vocabulary containing the character; and query the descending index table matching with the entity vocabulary library, and acquire the at least one entity vocabulary corresponding to the recognition character in the recognition character string.

* * * * *